United States Patent [19]
Teshirogi et al.

[11] 3,851,632
[45] Dec. 3, 1974

[54] METHOD FOR CONTROLLING NOXIOUS COMPONENTS OF EXHAUST GAS FROM DIESEL ENGINE

[75] Inventors: Naohisa Teshirogi; Hiroo Nakahara, both of Tokyo, Japan

[73] Assignee: Agency of Industrial Science & Technology, Tokyo, Japan

[22] Filed: Sept. 11, 1973

[21] Appl. No.: 396,325

[30] Foreign Application Priority Data
Sept. 11, 1972 Japan................................ 47-91575

[52] U.S. Cl............... 123/119 A, 60/276, 123/1 R, 123/32 R
[51] Int. Cl............................................ F02m 25/06
[58] Field of Search.................. 123/119 A, 1, 32 R; 60/276, 287

[56] References Cited
UNITED STATES PATENTS

| | | | |
|---|---|---|---|
| 2,720,856 | 10/1955 | Hoke .............................. | 123/119 A |
| 2,742,885 | 4/1956 | Thwaites et al................. | 123/119 A |
| 2,884,912 | 5/1959 | Lewis............................... | 123/119 A |
| 3,032,969 | 5/1962 | Barnes............................. | 60/276 |
| 3,559,402 | 2/1971 | Stone et al...................... | 123/119 A |
| 3,616,274 | 10/1971 | Eddy................................ | 60/276 |
| 3,702,110 | 11/1972 | Hoffman et al................. | 123/119 A |
| 3,774,391 | 11/1973 | Puttick............................ | 123/119 A |

FOREIGN PATENTS OR APPLICATIONS

| | | | |
|---|---|---|---|
| 600,895 | 4/1948 | Great Britain....................... | 60/276 |
| 1,963,235 | 12/1971 | Germany........................... | 123/119 A |

*Primary Examiner*—Wendell E. Burns
*Attorney, Agent, or Firm*—Kurt Kelman

[57] ABSTRACT

A sensor is inserted in the exhaust pipe of a normally aspirated type diesel engine. When the oxygen concentration in the exhaust gas from the engine falls below a preset level, the sensor detects the insufficiency of oxygen concentration and causes oxygen to be supplied into the cylinder so as to make up for the shortage of oxygen. By thus maintaining the oxygen concentration in the exhaust gas above the said preset level, noxious components of the exhaust gas are controlled.

1 Claim, 7 Drawing Figures

METHOD FOR CONTROLLING NOXIOUS COMPONENTS OF EXHAUST GAS FROM DIESEL ENGINE

BACKGROUND OF THE INVENTION

This invention relates to a method for the control of noxious components of the exhaust gas from the diesel engine.

It is known well that the exhaust gas from the diesel engine contains less noxious components than the exhaust gas from the gasoline engine. From this, it does not necessarily follow that the absolute quantity of such noxious components is smaller in the exhaust gas from the diesel engine, for the volume of the exhaust gas discharged is definitely larger. So, necessity is indicated for developing a measure to control the concentration of noxious components of the exhaust gas.

Especially with respect to nitrogen oxides ($NO_x$) which have been arousing serious public concern, attempts have been made to decrease generation of nitrogen oxides by measures such as recirculation of exhaust gas and incorporation of water spray, for example. They have failed to provide effective control of all noxious components present in the exhaust gas, because they entail disadvantages such as increased smoke concentraton and heightened carbon monoxide concentration. The noxious components, namely, smoke, carbon monoxide and hydrocarbon are caused preponderantly by shortage of oxygen. In the stage of partial load during which there exists excess oxygen, occurrence of such noxious components in the exhaust gas and formation of nitrogen oxides can both be controlled to some extent by recirculating the exhaust gas from the engine. The exhaust gas produced in the stage of high load does not contain any excess oxygen. If the exhaust gas of such oxygen content is recirculated, both smoke concentration and carbon monoxide and hydrocarbon contents increase so much as to render the recirculation of the exhaust gas impracticable. This means that desired decrease of the discharge of nitrogen oxides cannot be achieved merely by the recirculation of the exhaust gas.

A primary object of this invention is to provide a method for the control of noxious components of the exhaust gas from the diesel engine by recirculating the exhaust gas during the high-load operation of the engine for thereby repressing discharge of nitrogen oxides and at the same time decreasing both smoke concentration and carbon monoxide and hydrocarbon contents without sacrificing the engine output.

SUMMARY OF THE INVENTION

The method for the control of noxious components of the exhaust gas according to the present invention accomplishes the object described above by having normally aspirated type diesel engine capable of recirculation of the exhaust gas adapted so that, when the concentration of oxygen in the exhaust gas falls below a preset level during the high-load operation of the engine, a fresh supply of oxygen is introduced into the cylinder of the engine to make up for the shortage of oxygen and thereby control the formation of smoke, carbon monoxide and hydrocarbon and the generation of nitrogen oxides.

Other objects and other characteristics of this invention will become apparent from a further description of the invention to be given in detail herein below with reference to the attached drawings.

DETAILED DESCRIPTION OF THE INVENTION

Figure 1:
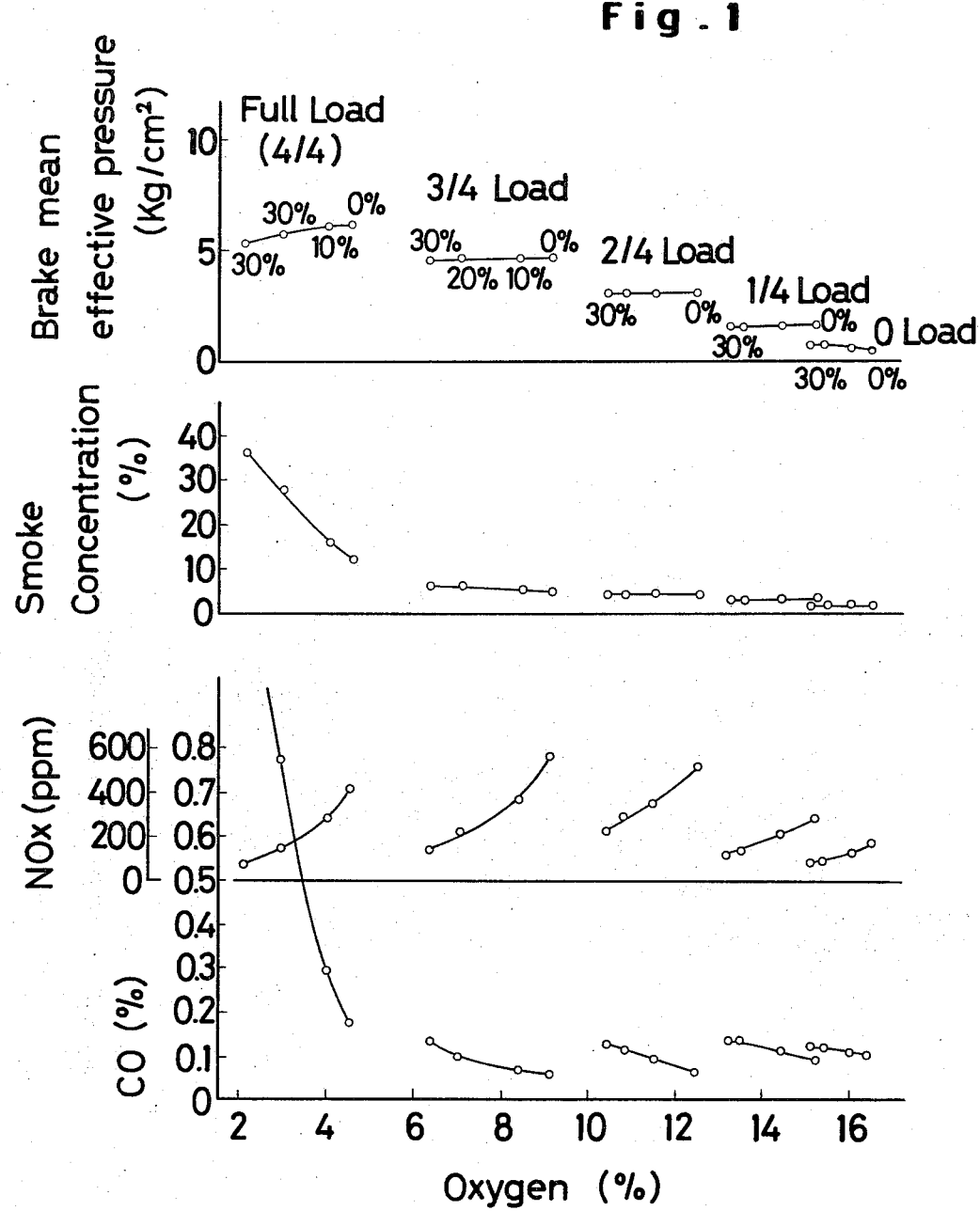
FIG. 1 is a graph showing the relation between the concentration of each noxious component and the concentration of oxygen in the exhaust gas.

FIG. 1 is a graph showing the relation between the concentration of each noxious component and that of oxygen present in the exhaust gas produced when a precombustion chamber type diesel engine is operated at the rate of 2,400 rpm, with torque (brake mean effective pressure), smoke concentration and nitrogen oxides and carbon monoxide concentrations graduated along the vertical axis and residual oxygen concentration in the exhaust gas graduated along the horizontal axis respectively. As parameters, four values of 0, 10, 20 percent and 30 percent of recirculation ratio and five values of 0, ¼, 2/4, ¾ and 4/4 ($\times$ 100 percent) of engine load factor are fixed. The graph indicates the residual oxygen concentrations determined for these parameters.

The mean effective pressure is about 5.2 kg/cm² when the engine is under full load (100 percent) and the exhaust gas is recirculated by 30 percent. In the absence of exhaust gas recirculation, the mean effective pressure is conspicuously improved to about 6.2 kg/cm². From the sole viewpoint of mean effective pressure, therefore, it would seem more desirable to omit the recirculation of the exhaust gas during the full-load operation of the engine. In addition, both smoke concentration and carbon monoxide content are appreciably lower in the absence of the recirculation of the exhaust gas than when the recirculation is made by 30 percent. On the other hand, the content of nitrogen oxides is strikingly larger in the absence of said recirculation. When the exhaust gas produced during the partial-load operation of the engine and containing a large excess of oxygen is recirculated to a certain extent, occurrence of nitrogen oxides is controlled and both smoke concentration and carbon monoxide content are prevented from being appreciably increased.

Figure 2A:
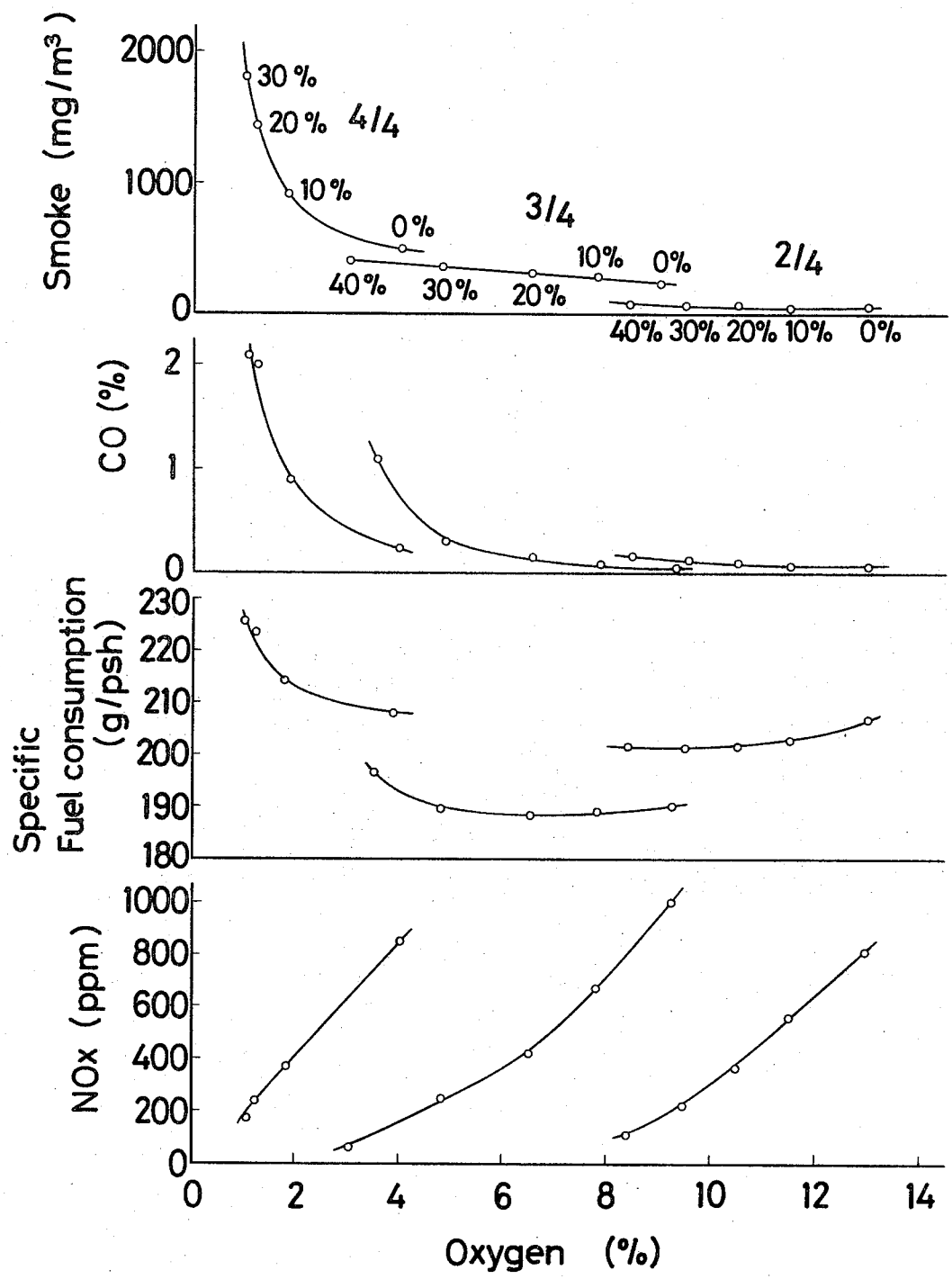
FIGS. 2A and 2B are other graphs showing the relation between the concentration of each noxious component and the concentration of oxygen in the exhaust gas.
Figure 2B:
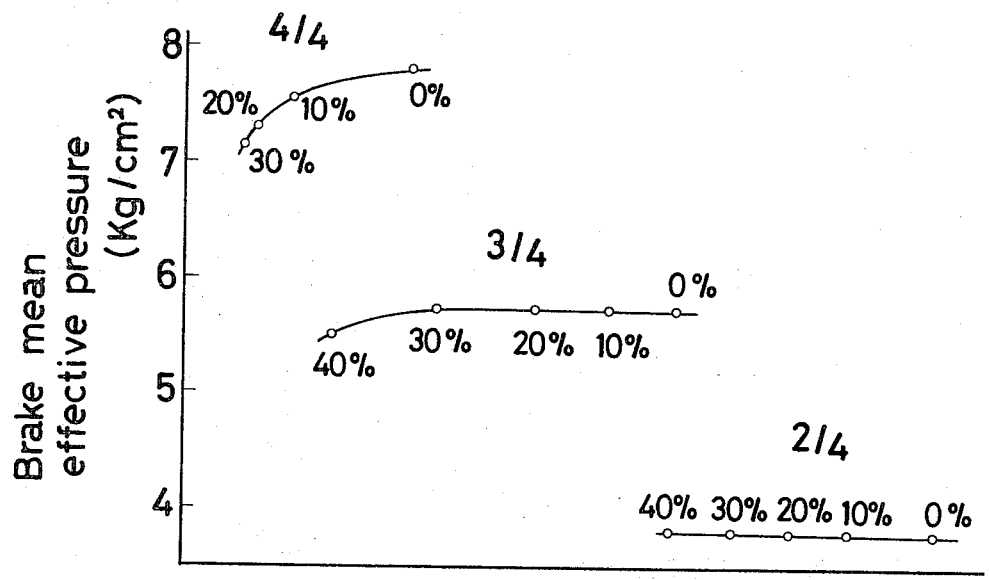
Figure 2B:
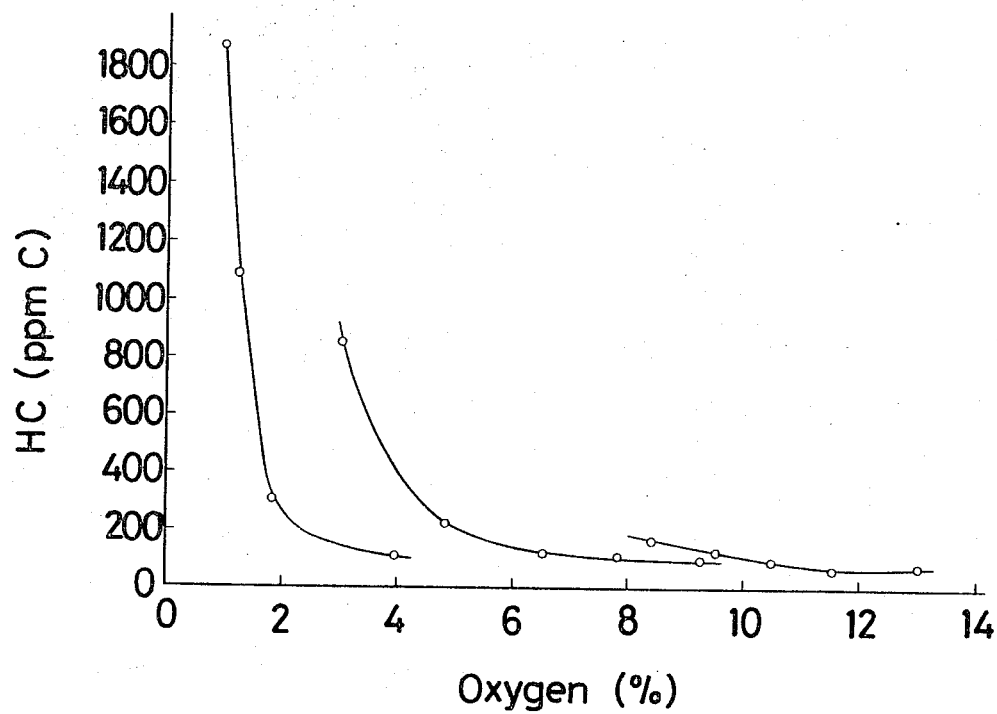

FIGS. 2A and 2B show the relation between the concentration of each noxious component formed and the concentration of oxygen present in the exhaust gas produced when a swirl chamber type diesel engine is operated under varying load of 4/4, ¾ and 2/4. The data of FIGS. 2A and B, similarly to those of FIG. 1, indicate that the concentrations of smoke, carbon monoxide and hydrocarbon are lower, the fuel consumption is lower and the engine output is higher in the absence of the recirculation of the exhaust gas than otherwise. By contrast, the concentration of nitrogen oxides is appreciably increased.

Through analysis of the test results described above, the inventors have arrived at a discovery that when the exhaust gas from a given diesel engine is recirculated while the concentration of oxygen contained in the exhaust gas is maintained above a fixed level, which is variable with the particular type of diesel engine, then the concentrations of carbon monoxide, hydrocarbon and smoke occurring in the exhaust gas can be controlled and the concentration of nitrogen oxides formed in the exhaust gas can be decreased to about half as much as would be formed in the absence of such recirculation. The present invention has been accomplished on the basis of this discovery.

Figure 3:
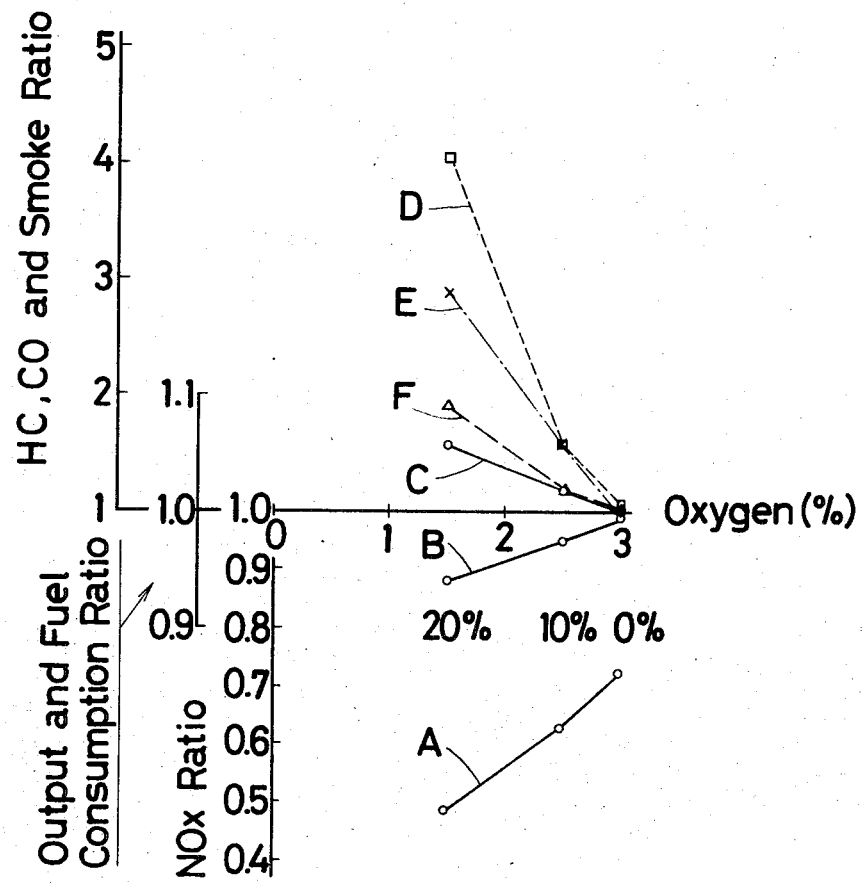
FIG. 3 is a graph comparing the amounts of noxious components produced, the output ratio and the fuel consumption in the cases where fresh oxygen is and is not supplied.

FIG. 3 is a graph comparing the amounts of noxious components produced, the output ratio (curve B) and the fuel consumption (curve C) observed in the presence of oxygen addition with the corresponding values observed in the absence of oxygen addition. It is seen from the graph that, in a diesel engine operated under full load at the rate of 2,000 rpm, the concentrations of carbon monoxide (curve D), smoke (curve E) and hydrocarbon (curve F) increase to about four times, about three times and about two times respectively, the fuel consumption increases to 1.05 times and the output declines to about 0.6 times respectively when the recirculation of the exhaust gas is made by 20 percent as compared with the case in which absolutely no recirculation of the exhaust gas is made (the value under this condition is "1"). By contrast, the concentration of nitrogen oxides is decreased to about half (curve A). If, at this time, oxygen is added so that the concentration of oxygen in the exhaust gas increased to 2.5 percent, then the concentrations of the noxious components except nitrogen oxides are sharply decreased. If more oxygen is added so as to bring the oxygen concentration to 3 percent, then the concentration of nitrogen oxides in the presence of the recirculation of the exhaust gas by 20 percent increases only to equal the concentration obtained in the absense of the recirucaltion.

If the exhaust gas produced during the full-load operation of the engine is measured for oxygen concentration and a fresh supply of oxygen is introduced when the measured oxygen concentration falls below a preset level, then the formation of the noxious components except nitrogen oxides in the exhaust gas can be controlled and the formation of nitrogen oxides can be decreased compared with the case in which no recirculation of the exhaust gas is made. Since it is for a relatively short period of time that the diesel engine is required to give the maximum output, desired control can be accomplished sufficiently by supplying fresh oxygen during that short period. This means that no large oxygen supply is required. Thus, the present invention can easily be practiced by having a cylinder of oxygen mounted on a given vehicle being operated by the diesel engine in question.

The voluminal ratio of the amount of the exhaust gas recirculated to the entire amount of the exhaust gas produced is generally determined by the ratio of the resistance offered by the pipe for recirculated exhaust gas to that offered by the exhaust pipe. On the other hand, the volume of the exhaust gas recirculated is directly proportional to the velocity within the exhaust pipe and substantially proportional to the load factor of the engine. It follows as a consequence that said volume is also proportional to the amount of the fuel injected. It may safely be concluded further that the volume of the exhaust gas thus recirculated is proportionally related to the amount of oxygen which is supplied, as described above, to make up for the shortage. Accordingly, any possible relationship with the speed of engine revolution may be disregarded. Between the time the engine completes its expansion stroke and the time it is about to begin the exhaust stroke, it is considered that the inner pressure of the cylinder is substantially in proportion to the load factor of the engine.

In the light of the various factors described to this point, the following two methods are conceivable for the recirculation of the exhaust gas.

The first method is applicable where the sum of the volume of the intake air and the volume of the exhaust gas to be recirculated equals the volume of the entire stroke. In this case, a fixed volume of the exhaust gas from the exhaust pipe is recirculated and it is supplied to the engine in conjunction with a fresh intake air.

The second method is applicable where the sum of the intake air equivalent to the volume of entire stroke and the volume of the exhaust gas to be recirculated equals the volume of the working gas within the entire cylinder of the engine. In this case, the gas pressure existing within the cylinder at the end of the expansion stroke is temporarily stored within a pressure storage chamber outside the cylinder by means of a switch valve synchronized with the piston motion and the gas pressure thus stored in the pressure storage chamber is delivered back to the cylinder by having the valve opened at the time subsequent intake stroke is completed.

This invention is applicable to either of the two methods of exhaust gas recirculation described above, as will be explained herein below with reference to concrete examples.

Figure 4:
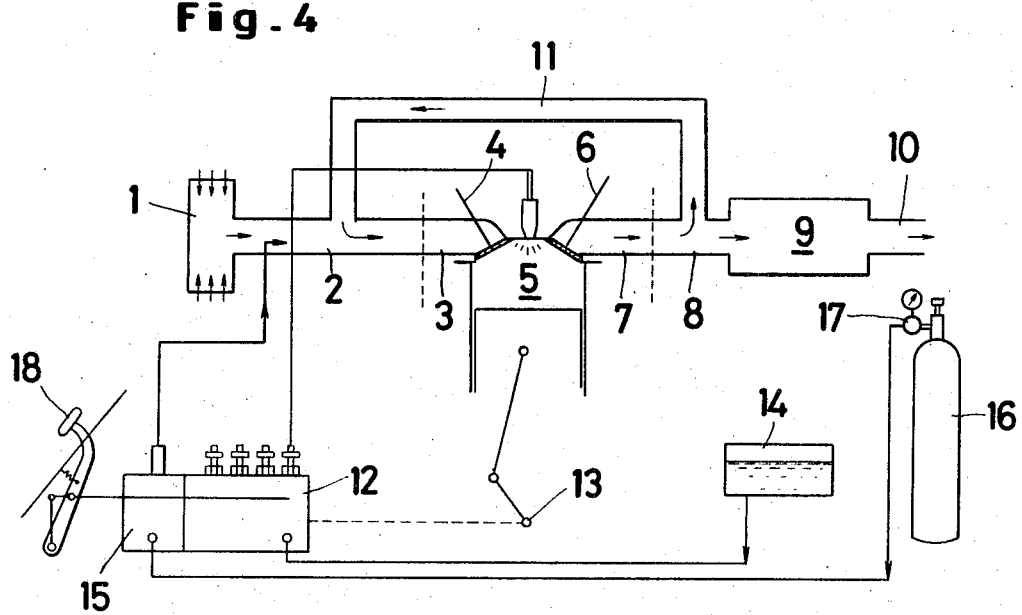
FIG. 4 is an explanatory diagram of one preferred embodiment of the device for practicing the method of this invention.

Referring to FIG. 4, the air taken in through an air cleaner 1 is passed through an intake pipe 2 and distributed by a intake manifold 3 to cylinders 5 via respective intake valves 4. The exhaust gas discharged through an exhaust valve 6 of each cylinder is combined at an exhaust manifold 7, passed through an exhaust pipe 8 and a muffler 9 and released into the atmosphere via an exhaust end 10. The portion of the exhaust gas to be recirculated is supplied to the intake pipe 2 via a circulation path 11 branched off the exhaust pipe 8 and mixed with the air being taken in. At this point, the amount (proportion) of the exhaust gas to be recirculated is determined by the ratio of the resistance offered to the gas by the muffler to the resistance offered by the circulation path 11. It is, therefore, necessary to fix this ratio while the engine under design.

A fuel injection pump 12 which is synchronized with the crank shaft 13 forwards the fuel in a fuel tank 14 to an injection nozzle. An oxygen pump 15 which is operated coaxially with said pump 12 forwards into the intake pipe 2 a controlled flow of oxygen which is supplied from an oxygen cylinder 16 via a reducing valve 17. The two pumps are regulated by the distance over which a foot-operated accelerator 18 is pushed in. Since this distance increases with the increasing load of the engine, it naturally follows that the amount of the fuel being supplied is proportionally increased and the amount of oxygen is required to be increased accordingly.

Figure 5:
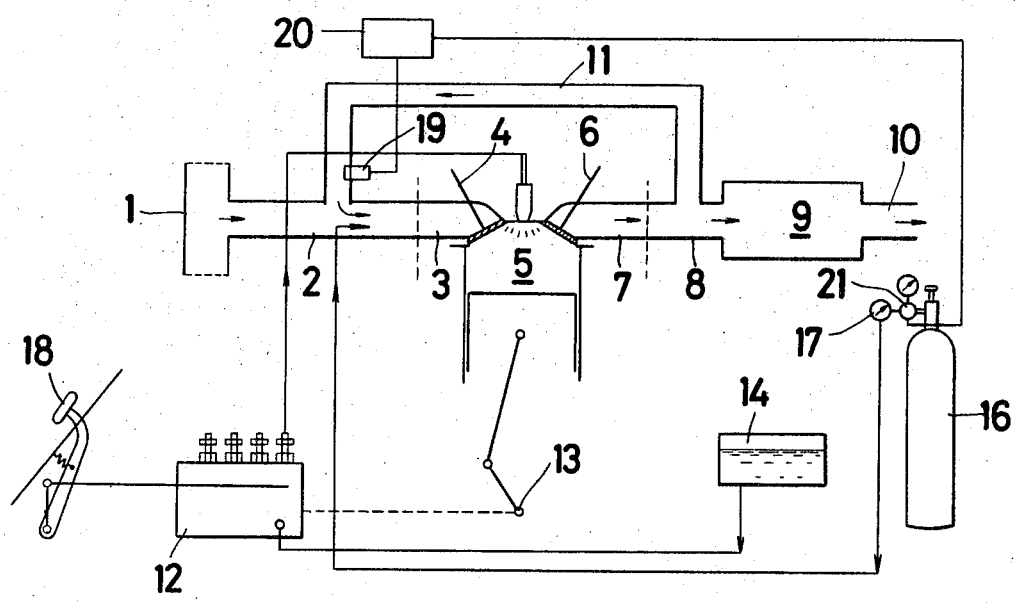
FIG. 5 is an explanatory diagram of another preferred embodiment of the device for practicing the method of this invention.

The device illustrated in FIG. 5 is identical with that of FIG. 4, except for the system used for the supply of oxygen.

A sensor is inserted in the circulation path 11 to permit constant check of the concentration of oxygen in the exhaust gas. Whenever the oxygen concentration falls below a preset level, the sensor detects the insufficiency of oxygen concentration and transmits an output corresponding to said insufficiency. The output is amplified by a control amplifier 20 to actuate a control valve 21 of the oxygen cylinder 16 and supply oxygen via the reducing valve 17 to the suction pipe 2. As the sensor 19 mentioned above, there may be used any known device available for detection of oxygen concentration, carbon monoxide concentration or smoke concentration. In the manner described above, the supply of oxygen is controlled so that the oxygen concentration in the exhaust gas will not fall below the preset level or the concentration of a given noxious component will be prevented from rising above a predetermined level.

The present example represents a case wherein the sensor 19 is positioned within the circulation path. As occasion demands, it may be incorporated in either the exhaust pipe 8 or the muffler 9.

Figure 6:
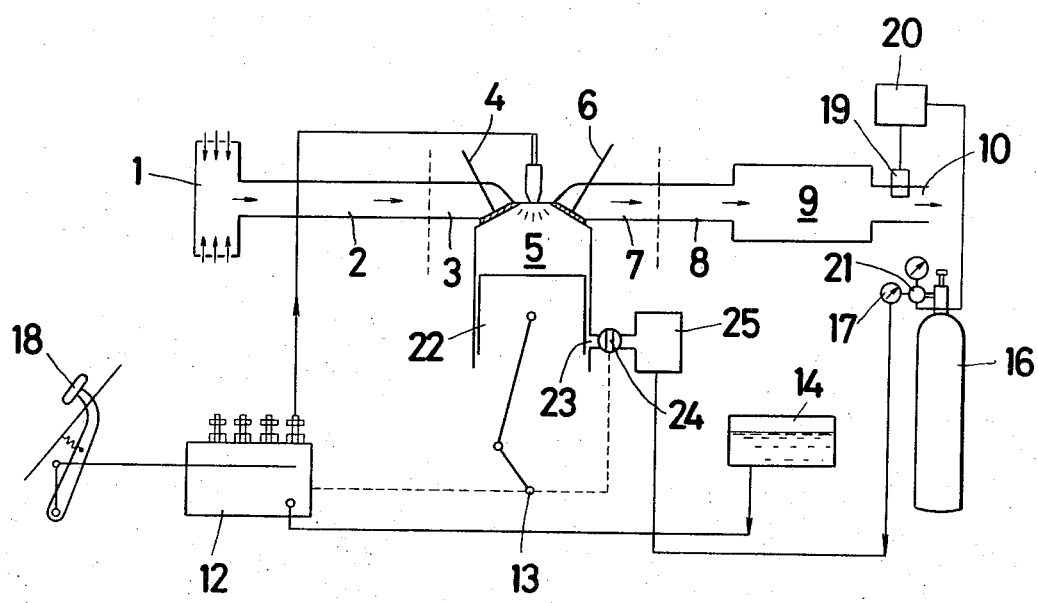
FIG. 6 is an explanatory diagram of still another preferred embodiment of the device for practicing the method of this invention.

FIG. 6 illustrates a device adapted simultaneously to practice the two methods described above. In this case, the intake and exhaust system is the same as that used in any ordinary diesel engine, except the sensor 19 is incorporated in the exhaust end 10 of the muffler 9 to permit constant check of the oxygen concentration in the exhaust gas. The recirculation of the exhaust gas is accomplished by causing the inner pressure of the cylinder existing toward the end of the expansion stroke to flow out of a port 23 which opens at the lower dead point of the cylinder wall above the head of a piston 22, pass through a valve 24 which communicates with the crank shaft 13 and finally reach and be stored in the pressure storage chamber 25 and, immediately after completion of the intake stroke, allowing the stored pressure to be released into the cylinder interior through the valve which is now opened. The oxygen which is supplied from the oxygen cylinder 16 whenever the sensor detects a fall of the oxygen concentration in the exhaust gas below the preset level is regulated by means of the aforementioned control valve 21 operating in response to the output from said sensor and forwarded through the reducing valve 17 to the pressure storage chamber 25.

As is clear from the foregoing explanation, the exhaust gas is recirculated while the concentration of oxygen in the exhaust gas is maintained at all times above a preset level (about 3 percent). Consequently, the amount of nitrogen oxides discharged is lowered to about half as much as when the recirculation of the exhaust gas is omitted and, at the same time, the concentrations of smoke and hydrocarbon and the content of carbon monoxide are controlled to the same level as when the engine is under partial load. Furthermore, since the supply of oxygen is made only when the engine is under high load, the oxygen requirement is quite small. The present invention, therefore, can be accomplished as by having an oxygen cylinder mounted on a vehicle and interlocked with a proper supply system communicating with the diesel engine proper, for example.

What is claimed is:

1. A method for the control of noxious components of the exhaust gas from a normally aspirated type diesel engine adapted to permit recirculation of the exhaust gas, improvement comprising having the exhaust gas constantly checked for oxygen concentration and, each time the oxygen concentration falls below a preset level, allowing additional oxygen to be supplied to said engine.

* * * * *